3,450,673
POLYURETHANE COMPOSITIONS FROM
DIAMINIMIDES
William J. McKillip, Minneapolis, Minn., assignor to Ashland Oil & Refining Company, Ashland, Ky., a corporation of Kentucky
No Drawing. Filed Sept. 7, 1965, Ser. No. 485,528
Int. Cl. C08g 22/32
U.S. Cl. 260—75
16 Claims

ABSTRACT OF THE DISCLOSURE

An improved polyurethane forming composition is provided comprising a mixture of a diaminimide and a polyhydroxyl component which upon heating at an elevated temperature results in the rearrangement of the aminimide groups to isocyanate groups and subsequent condensation thereof with the hydroxyl groups of the hydroxyl bearing component to yield the polyurethane.

---

The present invention relates to prepolymer compositions and to methods for producing polyurethanes from such compositions.

Polyurethanes are prepared by the reaction of polyisocyanates with an organic compound containing at least two active hydrogen containing groups capable of reacting with the isocyanate groups and preferably with a polyhydroxy compound. Mixtures of the isocyanate and the isocyanate co-reagent can be polymerized into plastics, coating compositions, laminating resins, elastomers, foams, adhesives and many other useful materials. Depending on the type of isocyanate and isocyanate co-reagent, concentration of each of these ingredients, catalysts and additives, the resulting polymer is tailor-made for the application intended. All of this is well-known to the art. In many applications, the polyurethane resin is formed in situ, by which is meant, that the polymer is shaped or applied prior to final polymerization of the reagents and that final polymerization takes place after such shaping and application. The disadvantage of urethane prepolymer compositions heretofore developed is that the mixture of the isocyanate, the active hydrogen containing compound and any catalyst has a short shelf life and results in premature polymerization, which can prevent the final product from achieving the desired properties. To overcome this deficiency, the urethane prepolymer composition is forwarded to the fabricator as a two-package system. The two components are mixed just prior to the application of the urethane prepolymer composition by the fabricator. This approach is, however, in many instances not satisfactory since there can still be a time lag between the mixing and the application. Additionally, the mixing must be carefully controlled and requires skills frequently not possessed by a fabricator. Furthermore, application and final polymerization conditions are dependent on the nature of the ingredients in the mixture, e.g., the degree of polymerization, and are readily upset by poor control of time and temperature of the prepolymer composition before application. It will, therefore, be apparent that it would be highly desirable to have a single-package urethane prepolymer system available which has a long shelf life and the polymerization of which can be controlled to occur when desired.

It is an object of the present invention to provide novel urethane prepolymer compositions.

It is another object of the present invention to provide novel single-package urethane prepolymer compositions.

It is a further object of the present invention to provide stable, single-package urethane prepolymer compositions, which can be further polymerized on heating.

It is still another object of the present invention to provide stable, single-package urethane prepolymer compositions containing polyisocyanate precursors.

Yet, another object is to provide a method for preparing polyurethanes.

Other objects will become apparent from the following description and claims.

The novel urethane prepolymer compositions of the present invention comprise mixtures of compounds containing at least two active hydrogen containing groups and a diaminimide having the general formula:

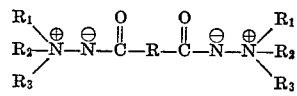

wherein R is a divalent radical selected from the class consisting of divalent hydrocarbon radicals, divalent ether radicals, divalent thioether radicals, divalent sulfone radicals, and divalent keto radicals and $R_1$ to $R_3$ are selected from the group consisting of alkyl radicals, aryl radicals, and radicals in which $R_1$ and $R_2$ combine to form heterocyclic rings with the nitrogen. The term aryl is meant to define an aromatic radical in which the unsatisfied valence is at a carbon of the aromatic ring.

The urethane prepolymer compositions of the present invention are transformed into polyurethanes by heating to temperatures at which the diaminimide decomposes. The decomposition of the diaminimide results in the formation of a diisocyanate which, in general, reacts in an exothermic manner with the isocyanate co-reagent to form the polyurethane. Surprisingly, it was discovered that once the polymerization has been initiated the heat of polymerization is sufficient to support the decomposition of the diaminimide.

Any organic compound which contains at least two active hydrogen containing groups, as determined by the Zerewitinoff method, and capable of reacting with an isocyanate group at the reaction conditions to form the urethane group is suitable. For practical purposes, however, the isocyanate co-reagent should be of sufficiently high enough molecular weight to be liquid at the conditions employed in the formation of the isocyanate from the diaminimide. In general, the active hydrogen containing groups are OH— groups, $NH_2$— groups, and SH— groups. Examples of suitable compounds containing at least two active hydrogen containing groups are polyhydric polyesters, polyhydric polyethers, polyhydric polythioethers, polyhydric polyacetals, high molecular weight aliphatic polyols, aliphatic thiols, polyamines, as well as mixtures of these compounds. The preferred isocyanate co-reagents are polyhydric polyesters and polyethers. The molecular weight of the co-reagent is preferably between about 500 to 5000 and the hydroxyl number is preferably in the range of about 25 to 800. The determination of these properties is well-known to those skilled in the art.

Suitable polyesters are obtained by the condensation of polycarboxylic acids with excess polyhydric alcohols. Such polycarboxylic acids include oxalic acid, malonic acid, succinic acid, glutaric acid, adipic acid, pimelic acid, suberic acid, azelaic acid, sebacic acid, brassylic acid, maleic acid, furamic acid, glutaconic acid, alpha-hydromuconic acid, isophthalic acid, terephthalic acid, trimellitic acid, pyromellitic acid, 1,4-cyclohexane dicarboxylic acid, and 1,4-cyclohexene dicarboxylic acid. Suitable polyhydric alcohols include ethylene glycol, 1,3-propylene glycol, 1,2-propylene glycol, 1,4-butylene glycol, 1,5-pentane diol, 1,4-pentane diol, 1,3-pentane diol, 1,6-hexane diol, 1,7-heptane diol, glycerol, trimethylol propane, 1,3,6-hexanetriol, triethanol amine, pentaerythritol, and sorbitol.

The polyhydric polyethers suitable in forming the urethane prepolymer composition of the present invention include polyhydric polyalkylene ethers, polyhydric arylene ethers as well as mixtures of the two. The polyethers employed are generally obtained by the condensation of alkylene oxides or of alkylene oxides with polyhydric alcohols although they can also be prepared from such starting materials as tetrahydrofuran, epihalohydrins and aralkylene oxides. The preferred alkylene oxides are those having from two to five carbon atoms and include ethylene oxide, propylene oxide, butylene oxide, styrene oxide, and amylene oxide. The polyhydric alcohols which can be employed in combination with the alkylene oxides have been described hereinabove.

The preparation of the isocyanate co-reagents is well-known in the art as is the use of such in the formation of polyurethanes. The diaminimides of the present invention can be employed with all of the isocyanate co-reagents which have heretofore been employed in the formation of polyurethanes provided only that such are liquid and stable at the temperatures required to liberate the diisocyanate from the diaminimide employed. Since the isocyanate co-reagents have molecular weights in excess of 500 and preferably in the range of 1500 to 3500, this limitation is inherently met by the co-reagents.

The diaminimides employed in the formation of the polyurethane compositions are prepared from the corresponding acid hydrazide by quaternization followed by treatment with base in accordance with the following reaction:

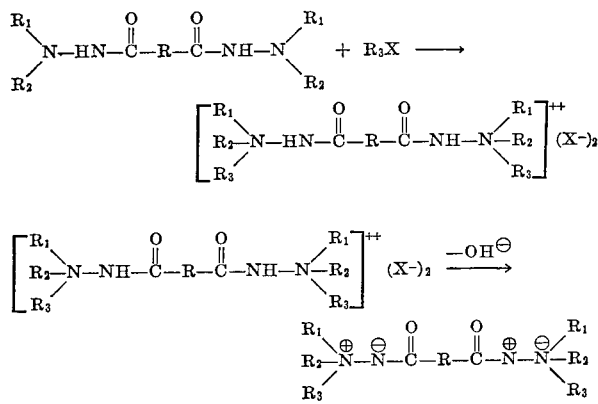

wherein R and $R_1$ to $R_3$ have the above-indicated meaning and X is a radical capable of forming an anion and preferably is a halogen. Alternately the two reactions leading to the formation of the diaminimide can be combined by reacting the acid hydrozide with $R_3X$ in the presence of a metal alkoxide to result in the formation of the diaminimide. The acid hydrozide employed in the formation of the diaminimide is obtained by the reaction of a diacid dichloride with an unsymmetrical hydrazine.

The reaction of the acid hydrazide with the quaternizing agent can be conducted in the absence of a solvent if a homogeneous liquid mixture of the reagents can be formed or in the presence of a diluent which is generally a polar solvent such as acetonitrile, isopropyl alcohol, water, dimethyl formamide. The reaction temperature can vary from room temperature to elevated temperatures which do not cause decomposition of the reagents or products. Generally the reaction is carried out at reflux temperatures for liquid reagents and at temperatures of 60° to 300° C. for reagents which require pressurization to prevent vaporization at the reaction temperatures. Thus, atmospheric as well as superatmospheric pressures are employed, depending on the reagents and reaction temperatures.

The quaternized acid hydrazide is then titrated with aqueous base such as aqueous sodium hydroxide to a neutral pH. The reaction mixture is evaporated and the diaminimide is extracted with a suitable solvent which does not cause appreciable solution of the by-product of the cation of the base with the anion of the quaternary salt.

Various methods can be employed to purify the resulting diaminimide, such as extraction followed by crystallization or precipitation, evaporation, and chromatographic separation.

The reaction of the diacid dichloride with the unsymmetrical hydrazine is exothermic in nature and is therefore preferably carried out in the presence of a solvent and with the use of reaction cooling means. Suitable solvents include hydrocarbons, esters, and ethers. The reaction temperature is generally maintained below about 15° C. at least during the initial mixing of the reagents. An excess of the hydrazine is employed in order to assure reaction with both acid groups.

Diacid dichlorides which can be employed to form acid hydrazides and then reacted to form diaminimides have the general formula $R-(COCl)_2$ 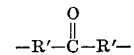 wherein R has the above-identified meaning and preferably is a divalent hydrocarbon radical. By the terms divalent ether radical, divalent thioether radical, divalent sulfone radical, and divalent keto radical are meant radicals which have the general formulas, $-R'-O-R'-$, $-R'-S-R'-$, $-R'-SO_2-R'-$, and $$-R'-\overset{\overset{O}{\|}}{C}-R'-$$

respectively, in which $R'$ is an alkylene or arylene radical. Specific diacid dichlorides include the dichlorides of malonic acid, succinic acid, alkyl-substituted succinic acid, glutaric acid, adipic acid, pimelic acid, suberic acid, sebacic acid, brassylic acid, phenyl glutaric acid, maleic acid, itaconic acid, glutaconic acid, phthalic acid, terephthalic acid, isophthalic acid, naphthalic acid, nadic acid, 1,2-cyclobutane dicarboxylic acid, 1,4-cyclohexane dicarboxylic acid, dimethylenesulfone dicarboxylic acid, bis-p-phenylenesulfone dicarboxylic acid, diethylene ether dicarboxylic acid, dimethylenethioether dicarboxylic acid and benzophenone dicarboxylic acid.

The unsymmetrical hydrazine employed in combination with the diacid dichlorides to form acid hydrazides which in turn are reacted to form diaminimides have the general formula:

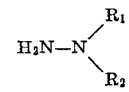

wherein $R_1$ and $R_2$ have the above-indicated meaning. Preferably $R_1$ and $R_2$ are lower alkyl groups, phenyl and substituted phenyl groups and such heterocyclic ring compounds as pyrrolidine, pyrrole, pyrroline, and piperidine. Specific examples of the unsymmetrical hydrazines employed to form the acid hydrazides include dimethyl hydrazine, diethyl hydrazine, methyl-ethyl hydrazine, dibutyl hydrazine, N-aminopyrrolidine, N-amino-2-methylpyrrolidine, N-amino-2-phenylpyrrolidine, N-aminopyrrole, N-amino-2,5-dimethylpyrrole, N-aminopyrroline, N-amino-2-phenylpyrroline, diphenyl hydrazine, dicresyl hydrazine, di-p-nitrophenyl hydrazine, and methylphenyl hydrazine.

The quaternizing agent employed in the formation of the quaternary salt has the general formula $R_3X$ wherein $R_3$ is as above-indicated and preferably is a lower alkyl radical or a phenyl or substituted-phenyl radical. When $R_3$ is benzylic or allylic, the R group in the diacid dichloride should preferably have a greater migratory aptitude than $R_3$. Otherwise, the benzylic or allylic group may preferentially rearrange to the electron rich nitrogen, thus giving other than the desired products. The term "migratory aptitude" means that property of an organic radical which determines its capacity to redistribute itself, e.g., migrate from an electron-deficient nitrogen to an electron-rich nitrogen. X can be any quaternizing anion but is preferably a halogen such as chlorine, bromine, or iodine. Non-halogen radicals capable of forming the anion of the quaternary salt include methyl sulfonate and similar monovalent acid radicals. Suitable quaternizing agents therefore include, methyl chloride, ethyl chloride, methyl iodide, ethyl bromide, phenyl chloride, p-nitrophenyl chloride, cresyl iodide, phenyl methyl sulfonate, and methyl toluene sulfonate.

The novel diaminimides which can be formed by the above-described reagents and reactions include bis-trimethylamine malonimide, bis-triethylamine malonimide, bis-trimethylamine adipimide, bis-tributylamine adipimide, bis-triphenylamine adipimide, bis-dimethylphenylamine adipimide, bis-dimethylethylamine adipimide, bis-N - methyl - pyrrolidine adipimide, bis - N - ethyl - 2-phenylpyrrolidine adipimide, bis - N - methyl - 2 - methylpyrrolidine adipimide, bis - N - methylpyrrole adipimide, bis - N - phenylpyrrole adipimide, bis - methyldiphenylamine pimelimide, bis-triphenylamine azelaimide, bis-trimethylamine azelaimide, bis-triethylamine azelaimide, bis-trihexylyamine azelaimide, bis-trimethylamine sebacimide, bis-di-p-nitrophenylmethylamine sebacimide, bis-methyldicresylamine sebacimide, bis-dimethylphenylamine sebacimide, bis-trimethylamine dodecane diimide, bis-trimethylamine terephthalamide, bis-triethylamine terephthalimide, bis-tributylamine terephthalimide, bis-trihexylamine terephthalimide, bis - triphenylamine terephthalimide bis-dimethylphenylamine terephthalimide, bis-diphenylmethylamine terephthalimide, bis-N-methylpyrrole terephthalimide, bis-N-ethylpyrroline terephthalimide, bis - N - phenylpyrroline terephthalimide, bis - N-methylpyrrolidine terephthalimide, bis-N-methyl-2-phenylpyrrolidine terephthalimide, bis-trimethylamine toluene-2,4-dicarboximide, bis - trimethylamine toluene-3,5-dicarboximide, bis-triphenylamine phthalimide, bis-trimethylamine phthalimide, trimethylamine isophthalimide, bis-trimethylamine ethylbenzene-2,4-dicarboximide, bis-trimethylamine n-butylbenzene-2,6-dicarboximide, and bis-trimethylamine naphthalene-1,5-dicarboximide. The preferred diaminimides employed in the formation of the urethane prepolymer compositions have the general formulas:

$$\left[\begin{array}{c}R_1\\R_2-\overset{\oplus}{N}-\overset{\ominus}{N}-\overset{O}{\overset{\|}{C}}-\\R_3\end{array}\right]_2-C_nH_{2n} \quad \text{and} \quad \left[\begin{array}{c}R_1\\R_2-\overset{\oplus}{N}-\overset{\ominus}{N}-\overset{O}{\overset{\|}{C}}-\\R_3\end{array}\right]_2-\phantom{x}\underset{\phantom{x}}{\bigcirc}-(Y)_4$$

wherein $n$ is an integer of 1 to 12, $R_1$ to $R_3$ are lower alkyl groups, i.e., alkyl groups of 1 to 6 carbon atoms and Y is either a hydrogen or a lower alkyl group.

The formation of the diaminimides is further illustrated by the following procedure which is equally applicable to the preparation of other diaminimides.

Into a round bottom flask equipped with a mechanical stirrer and addition funnel is dissolved 99.2 g. of sebacyl chloride in 150 ml. of hexane. The solution is externally cooled to maintain a temperature below 15° C. and 117 g. of 1,1-dimethyl hydrazine is added slowly with agitation over a period of one hour. After addition of the 1,1-dimethyl hydrazine, the solution is stirred for an additional 12 to 16 hours at room temperature. The resulting reaction mixture is filtered and the solids thus obtained are dissolved in about 800 ml. of water and treated with 33.2 g. of sodium hydroxide dissolved in 300 ml. of water. The resulting solution is stripped of volatiles at 60° C. and 10 to 20 mm. Hg. The residue is extracted successively with 800, 400, and 200 ml. portions of acetone. Evaporation of the acetone resulted in 91.2 g. of bis-N,N-dimethylsebacylhydrazide, representing a 74% yield.

In a 2 liter Parr reactor, 111 g. of bis-N,N-dimethylsebacyl hydrazide is added to a solution consisting of 237 g. of isopropyl alcohol, 100 g. of water and 2 g. of sodium bicarbonate. The stirred mixture is heated to 200° to 220° F. and the total pressure is adjusted to about 70 p.s.i. by addition of methyl chloride gas. The pressure is maintained until no further methyl chloride is taken up by the reaction mixture. The reactor is cooled and the solid product is collected. On evaporation of the liquid reaction mixture, the residue is combined with the previously collected product and recrystallized. A total of 108 g., 72% yield of the quaternary salt having the formula:

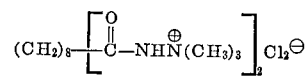

is obtained.

The quaternary salt, 42.7 g., is dissolved in 100 ml. of water and treated with 91 ml. of 2.2 N aqueous sodium hydroxide. The solution is evaporated to dryness and the residue pulverized and extracted with boiling acetone. The acetone is evaporated and the solid residue recrystallized from acetone. A 78% yield of bis-trimethylamine sebacimide is obtained.

The ratio in which the diaminimide and the isocyanate co-reagent are admixed depends on several factors including the intended utility of the composition. In general, however, at least sufficient quantities of the diaminimide are employed to form enough diisocyanates to satisfy substantially all of the active hydrogen containing groups. The quantity of diaminimide employed in each particular application is equivalent to the quantity of diisocyanate heretofore employed in the same application. Since diaminimides form stable mixtures with the isocyanate co-reagent, the order in which the components are admixed is a matter of choice.

Additives which have heretofore been employed in urethane prepolymer compositions based on mixtures of diisocyanates and isocyanate co-reagents can similarly be employed in the urethane prepolymer compositions of the present invention. Such additives can be catalysts for the polymerization, blowing agents, stabilizers, chain extenders and cross-linking agents. It is to be noted that one type of polymerization catalyst, namely tertiary amines, are formed in the decomposiiton of diaminimides of the present invention.

The polyurethanes have theretofore been formed by heating mixtures of diisocyanates and isocyanate co-reagents to temperatures of 100° to 250° C. The polymerization is generally exothermic in nature and one properly initiated requires no further external heating. The decompositions of the diaminimides employed in the present invention occur at temperatures in the range of 150° to 250° C. It will, therefore, be apparent that the temperature range for the decomposition of diaminimides is essentially the same as that for polyurethane formation. Once initiated, the decomposition of the diaminimides to diisocyanates can be uniformly maintained by properly controlling the external heating.

The urethane prepolymer compositions of the present invention find utility as laminating resins, metal to metal adhesives, as casting resins for the formation of elastomeric shaped articles, and as coating compositions which are baked to the substrate.

The invention is further illustrated by the following examples in which all units of quantity are by weight unless otherwise indicated.

EXAMPLE I

Into an aluminum reaction vessel is charged 50.34 parts of a commercial polyester having a hydroxyl number of 55 and an equivalent weight of 985. The polyester is heated to 60° to 90° C. and mixed with 13.4 parts of bis-trimethylamine adipimide. On further heating a clear solution is obtained at 150° C. On heating to about 160° C. an exothermic reaction occurs causing the temperature to rise to 180° C. The reaction mixture releases trimethylamine during the exothermic reaction. On completion of the reaction, the temperature drops back to that of the external heating source. The reaction mixture is then allowed to cool to room temperature and gels into a solid elastomeric polymer. Analysis of the product shows essentially complete reaction of the hydroxyl groups of the polyester with isocyanate.

EXAMPLE II

Into an aluminum reaction vessel is charged 50.1 parts of a commercial polyester having a hydroxyl number of 55 and an equivalent of 985 and admixed at room temperature with 7.7 parts of bis-trimethylamine isophthalylimide and 0.6 parts of stannous octoate (T–9) as a catalyst. The resulting mixture is stable and non-reactive at room temperature. The mixture is heated to about 170° C., whereupon trimethylamine vaporizes from the reaction mixture. Further heating to 250° C. causes the mixture to gel. On cooling to room temperature, a tough elastomeric polyurethane results. Analysis of the polymer obtained shows essentially complete reaction of the hydroxyl groups of the polyester with isocyanate.

EXAMPLE III

Into an aluminum reaction vessel is charged 26.5 parts of a commercial polyester resin having a hydroxyl number of 55 and an equivalent weight of 985 and 0.2 part of stannous octoate (T–9) as a catalyst. The mixture is heated to 60° C. and 4.467 parts of bis-trimethylamine azelaimide is added. The reaction mixture is heated to 150° C. which causes an exothermic reaction to occur raising the temperature to above 175° C. with the evolution of trimethylamine. On completion of the exothermic reaction the mixture is cooled to room temperature and a tacky polyurethane is obtained.

The foregoing examples have illustrated the formation of the single package polyurethane compositions of the present invention obtained by simply mixing the diaminimides with the isocyanate co-reagent. The transformation of these compositions into polyurethanes by heating is similarly illustrated. In view of the significant art developed on polyurethane compositions and the formation of polyurethanes, many alternate means of mixing and reacting the compositions of the present invention will be apparent. The simple methods employed to form the compositions of the present invention and to convert such to the polyurethanes make it apparent that such are equally applicable to diaminimides and isocyanate co-reagents not specifically illustrated in the examples but included in the scope of the invention.

As many widely different embodiments of this invention can be made without departing from the spirit and scope thereof, it is to be understood that this invention is not limited to the specific embodiments thereof except as defined in the appended claims.

What is claimed is:

1. A urethane prepolymer composition comprising a mixture of a compound containing at least two active hydrogen containing groups and a diaminimide having the general formula:

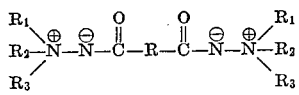

wherein
R is a radical selected from the class consisting of (a) divalent aliphatic
(b) arylene
(c) —R$^1$—O—R$^1$—
(d) —R$^1$—S—R$^1$—
(e)

(f) —R$^1$—SO$_2$—R$^1$—

R$^1$ is alkylene or arylene
R$_1$, R$_2$ and R$_3$, when taken singly, represent an alkyl or aryl group R$_1$ and R$_2$, when taken collectively with the nitrogen atom to which they are attached represent a heterocyclic ring selected from the group consisting of pyrrolidine, pyrroll, pyrroline and piperidine.

2. Urethane prepolymer composition of claim 1 wherein the compound containing active hydrogen containing groups is a polyhydric polyester having a molecular weight of 500 to 5000 and a hydroxyl number of 25 to 800.

3. The urethane prepolymer composition of claim 1 wherein the compound containing an active hydrogen containing group is a polyalkylene ether having a molecular weight of 500 to 5000 and a hydroxyl number of 25 to 800.

4. The urethane prepolymer composition of claim 1 wherein R is a divalent hydrocarbon radical.

5. The urethane composition of claim 1 wherein R$_1$ to R$_3$ are alkyl radicals.

6. Urethane prepolymer composition of claim 1 wherein the diaminimide has the general formula:

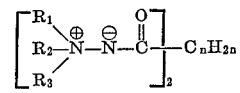

wherein $n$ is from 1 to 12 and R$_1$ to R$_3$ are lower alkyl groups.

7. The urethane prepolymer composition of claim 1 wherein the diaminimide has the general formula:

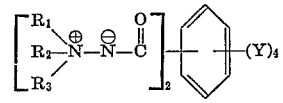

wherein R$_1$ to R$_3$ are lower alkyl groups and Y is selected from the class consisting of hydrogen and lower alkyl groups.

8. A urethane prepolymer composition comprising a polyhydric polyester having a molecular weight of 500 to 5000 and a hydroxyl number of 25 to 800 and a diaminimide having the general formula:

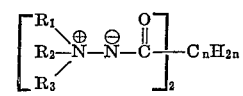

wherein $n$ is from 1 to 12 and R$_1$ to R$_3$ are lower alkyl groups.

9. A urethane prepolymer composition comprising a polyhydric polyester having a molecular weight of 500 to 5000 and a hydroxyl number of 25 to 800 and a diaminimide having the general formula:

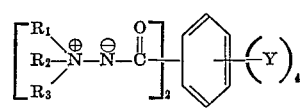

wherein R$_1$ to R$_3$ are lower alkyl groups and Y is selected from the class consisting of hydrogen and lower alkyl groups.

10. The urethane prepolymer composition of claim 8 wherein the diaminimide is bis-trialkylamine adipimide.

11. The urethane prepolymer composition of claim 8 wherein the diaminimide is bis-trialkylamine azelaimide.

12. The urethane prepolymer composition of claim 9 wherein the diaminimide is bis-trialkylamine isophthalimide.

13. The process of preparing a polyurethane which comprises heating a mixture of a compound containing at least two active hydrogen containing groups and a diaminimide having the general formula:

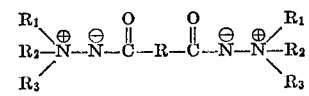

wherein
R is a radical selected from the class consisting of
(a) divalent aliphatic
(b) arylene
(c) $-R^1-O-R^1-$
(d) $-R^1-S-R^1-$
(e) $-R^1-\overset{\overset{O}{\|}}{C}-R^1-$
(f) $-R^1-SO_2-R^1-$ $R^1$ is alkylene or arylene $R_1$, $R_2$ and $R_3$, when taken singly, represent an alkyl or aryl group.

$R_1$ and $R_2$, when taken collectively with the nitrogen atom to which they are attached represent a heterocyclic ring selected from the group consisting of pyrrolidine, pyroll, pyrroline and piperidine.

14. The process of claim 13 wherein the compound containing active hydrogen containing groups is a polyhydric polyester having a molecular weight of 500 to 5000 and a hydroxyl number of 25 to 800.

15. The process of claim 13 wherein the diaminimide has the general formula:

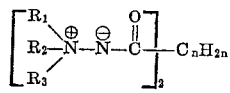

wherein $n$ is from 1 to 12 and $R_1$ to $R_3$ are lower alkyl groups.

16. The process of claim 13 wherein the diaminimide has the general formula:

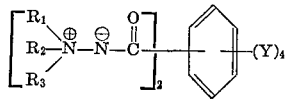

wherein $R_1$ to $R_3$ are lower alkyl groups and Y is selected from the class consisting of hydrogen and lower alkyl groups.

References Cited

UNITED STATES PATENTS 3,151,143   9/1964   Hoch _____ 260—77.5 XR

DONALD E. CZAJA, *Primary Examiner.*

M. J. WELCH, *Assistant Examiner.*

U.S. Cl. X.R.

252—182; 260—77.5, 558, 559, 561